(No Model.)
P. O'MEARA.
TRANSPLANTER.
No. 433,957. Patented Aug. 12, 1890.
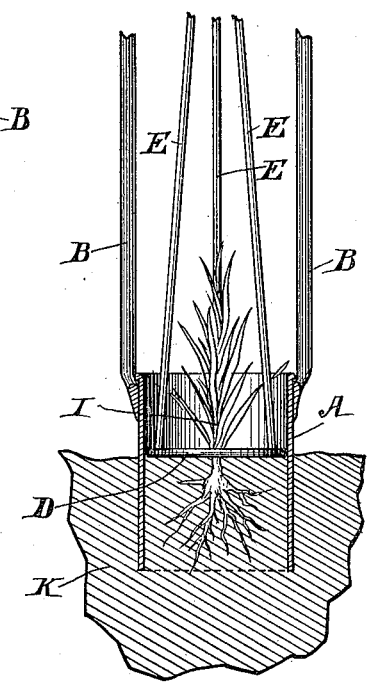
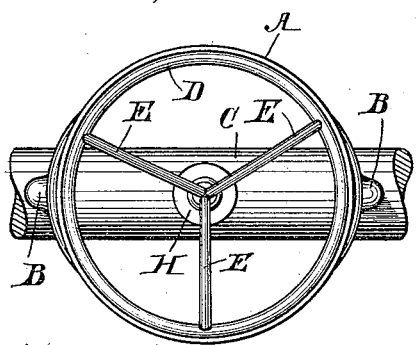
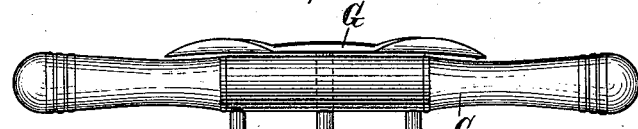
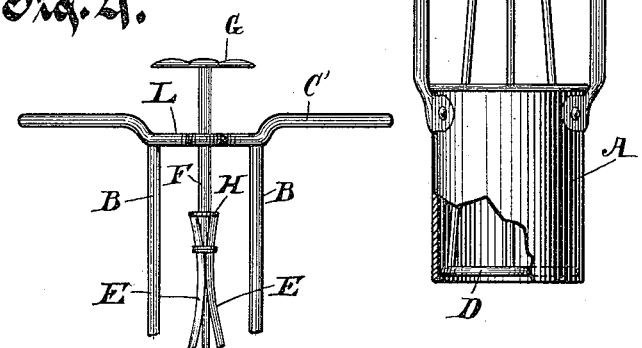
Witnesses.
C. H. Keeney,
Anna Faust.
Inventor
Patrick O'Meara
Ernest Benedict
Attorneys.

UNITED STATES PATENT OFFICE.

PATRICK O'MEARA, OF WEST BEND, WISCONSIN.

TRANSPLANTER.

SPECIFICATION forming part of Letters Patent No. 433,957, dated August 12, 1890.

Application filed February 17, 1890. Serial No. 340,770. (No model.)

*To all whom it may concern:*

Be it known that I, PATRICK O'MEARA, of West Bend, in the county of Washington and State of Wisconsin, have invented a new and useful Transplanter; and I do hereby declare the following to be a full, clear, and exact description of said invention, reference being had to the accompanying drawings, and to the letters of reference marked thereon, which form a part of this specification.

The object of my invention is to provide a device adapted for taking up and removing from one place to another or transplanting vines or small plants, like strawberry-plants.

In the drawings, Figure 1 is a view of my complete device, a portion of the cylinder being broken away to show the relation of interior parts. Fig. 2 is a view of the bottom end of the device, the handles being broken away for convenience of illustration. Fig. 3 is a view of a portion of the device, parts being in section to show its method of use as a transplanter. Fig. 4 is a view of a modified form of handle.

A small hollow cylinder A, preferably constructed of sheet-steel, its lower edge being comparatively sharp to form a cutting-edge, is provided with two parallel upright shanks B B, conveniently formed of metal rods secured rigidly to the sides of the cylinder A, near its top and opposite each other, which shanks at their upper extremities are secured fixedly in a laterally-extending handle C. A ring-plunger D, preferably made of a large wire or small round rod formed into a complete ring of proper size to fit nicely, but movably in the cylinder A, is provided with a rigid shank consisting of the brace-rods E E, which incline inwardly toward each other and are joined together at the top at some distance above the plunger, and the single rod F, to which the rods E E are affixed, which rod passes movably through the handle C, medially between the shanks B B, the plunger-shank being also provided with a laterally-extending handle or cross-head G. The cross-head G terminates at each end in curved thumb-pieces adapted to receive the two thumbs therein of the person who is using the transplanter, and whose hands are grasped about the ends of the handle C, whereby when the plunger is supported by earth in the cylinder at a distance above its lowest travel it may be forced down by pressure from the thumbs on the cross-bar G. A shoulder or stop H is affixed to the plunger-rod F, and is adapted to engage the handle C, thereby limiting the travel of the plunger-rod upwardly so that it cannot be withdrawn from the cylinder A.

In use the transplanter is placed over and about a plant I, and the cylinder is forced down into the ground K, as shown in Fig. 3, the plunger being allowed to rest on the surface of the ground, and being thereby raised in the cylinder as the cylinder is thrust into the earth about and below the roots of the plant, and when the cylinder has been thrust downwardly a sufficient depth the transplanter is raised out of the ground, carrying the plant and the surrounding earth in the cylinder with it, the earth adhering to the sides of the cylinder with sufficient tenacity to be raised therewith, and thereupon the transplanter with its supported load is removed to the point at which the plant is to be deposited, which may be either on some vehicle, as a wheelbarrow, or on some spot at which the plant is to be set out, and then the plunger is forced down against the earth in the cylinder by pressure on the cross-head G, whereby the earth in the cylinder is forced out of it, carrying the plant with it in such manner as not to disturb the earth about the roots of the plant. The rods E E are sufficiently far apart from the plunger to a considerable distance above it to avoid improper crowding or interference with the leaves of the plant. I have shown and described a cylinder; but a square or angular device could be made and would be deemed an equivalent for the cylinder described, though the cylindrical form is greatly to be preferred.

In the modified form of device shown in Fig. 4 the cross-handle C' is formed with a central shallow depression L, adapted to receive the plunger cross-head therein, whereby the necessary travel of the plunger cross-head is carried a little lower with reference to the cross-handle than it is in the form shown in Fig. 1, and may therefore be properly limited to a less height above it, thereby forming a device more convenient for use by persons having small hands.

What I claim as new, and desire to secure by Letters Patent, is—

A transplanter consisting of a hollow cylinder having a lower sharp edge, upwardly-extending shanks fixed rigidly to the cylinder, and a cross-bar handle secured rigidly to the tops of the shanks, in combination with a ring-plunger fitted to and traveling vertically within the cylinder, a shank fixed to the plunger, which shank is formed in part of a single vertical rod passing medially through the cross-bar handle, and a cross-head affixed to the single rod of the plunger-shank above the handle, which cross-head is shorter than the cross-handle and is arranged to move vertically above and parallel with the handle, the cross-head being arranged to receive the thumbs of the person whose hands grasp the extremities of the handle, substantially as described.

In testimony whereof I affix my signature in presence of two witnesses.

PATRICK O'MEARA.

Witnesses:
 HENRY WAHB,
 ANDREW SCHMIDT.